(12) United States Patent
Ohnishi

(10) Patent No.: US 6,882,903 B2
(45) Date of Patent: Apr. 19, 2005

(54) ELECTRIC DEVICE

(75) Inventor: Tsuginori Ohnishi, Takefu (JP)

(73) Assignee: Orion Electric Company Ltd., Fukui-ken (JP)

( * ) Notice: Subject to any disclaimer, the term of this patent is extended or adjusted under 35 U.S.C. 154(b) by 0 days.

(21) Appl. No.: 10/792,866

(22) Filed: Mar. 5, 2004

(65) Prior Publication Data

US 2004/0176878 A1 Sep. 9, 2004

(30) Foreign Application Priority Data

Mar. 7, 2003 (JP) .......................................... 2003-061952

(51) Int. Cl.[7] .............................................. G06F 19/00
(52) U.S. Cl. ........................ 700/293; 700/286; 713/400
(58) Field of Search ................... 700/292, 291, 700/293, 298, 296, 286; 361/115; 713/400

(56) References Cited

U.S. PATENT DOCUMENTS 4,471,232 A * 9/1984 Peddie et al. ................. 307/35
6,462,967 B1 * 10/2002 Fujisawa et al. .............. 363/39

FOREIGN PATENT DOCUMENTS

JP 05-108503 4/1991

* cited by examiner

Primary Examiner—Kidest Bahta
(74) Attorney, Agent, or Firm—Reed Smith LLP; Stanley P. Fisher, Esq.; Juan Carlos A. Marquez, Esq.

(57) ABSTRACT

This invention is intended to be capable of accurately detecting whether an electric device is in a stand-by mode or power stoppage occurs. An electric device 20 includes a power supply circuit 12, a power stoppage detection circuit 15, and a control microcomputer 10. The power stoppage detection circuit 15 generates a detection signal based on a voltage input from the power supply circuit 12. This detection signal is input from the power stoppage detection circuit 15 to the control microcomputer 10. The control microcomputer 10 detects a state of an operation of the power supply circuit 12 based on the detection signal input from the power stoppage detection circuit 15. If the detection signal is not detected for a constant time or more, the control microcomputer 10 determines that the power stoppage occurs to the power supply circuit 12. It is thereby possible to prevent the control microcomputer 10 from erroneously determining that the power stoppage occurs even if the power supply circuit 12 performs an intermittent oscillation operation while the electric device 20 is in the stand-by mode.

3 Claims, 2 Drawing Sheets

ELECTRIC DEVICE

BACKGROUND OF THE INVENTION

1. Field of the Invention

The present invention relates to an electric device in which a control microcomputer controls the electric device to stop its operation based on detection of occurrence of power stoppage in the power supply circuit.

2. Description of the Related Art

An electric device normally includes a power supply circuit which obtains an operating power to allow the electric device to operate by a power supplied from a commercial power supply. In addition, the electric device often includes a control microcomputer which controls an operation of the electric device.

In the electric device that includes the control microcomputer, the control microcomputer often detects an output of the power supply circuit through a power stoppage detection circuit. In the electric device of this type, if the power supply circuit does not output the operating power due to power stoppage or the like, the control microcomputer detects that the power supply circuit is stopped based on a signal input from the power stoppage detection circuit.

The power supply circuit often includes a power semiconductor switching element such as a power FET and obtains the operating power using an oscillation operation of this power semiconductor switching element.

If the electric device, which includes the power supply circuit and the control microcomputer as stated above, is in a stand-by mode in which the electric device does not operate and in which the start of the operation of the electric device is awaited, the output of the power supply circuit is normally suppressed to hold down unnecessary power consumption. The output of the power supply circuit in the stand-by mode is suppressed often by an intermittent oscillation operation of the power semiconductor switching element.

In order for the control microcomputer to detect a state of the operation of the electric device even if the electric device is in the stand-by mode, it is necessary to supply a voltage signal at a constant level to the control microcomputer from the power stoppage detection circuit.

In order to supply the voltage signal at the constant level to the control microcomputer even if the electric device is in the stand-by mode, the power stoppage detection circuit includes an assurance circuit comprised of a capacitor or the like that assures a signal level.

However, if the power supply circuit performs the intermittent oscillation operation, even the assurance circuit cannot often keep the signal input to the control microcomputer from the power stoppage detection circuit at the constant level.

If the level of the signal input from the power stoppage detection circuit to the control microcomputer does not reach the constant level, the control microcomputer erroneously determines that the power supply is stopped by power stoppage or the like.

If so, the control microcomputer makes the microcomputer itself stopped and controls the electric device to be stopped although the electric device is in the stand-by mode. As a result, even if the electric device is actuated to start its operation, the electric device cannot disadvantageously operate.

SUMMARY OF THE INVENTION

It is, therefore, an object of the present invention to provide an electric device capable of detecting whether the electric device is in a stand-by mode or power stoppage occurs.

According to one aspect of the present invention, there is provided an electric device comprising: a control microcomputer; a power supply circuit for converting a power supplied from a commercial power supply to an operating power, and for outputting the operating power; and a power stoppage detection circuit for inputting a signal generated according to an output of the power supply circuit to a power stoppage detection terminal of the control microcomputer, wherein the control microcomputer detects the power stoppage occurs to the power supply circuit based on the signal input to the power stoppage detection terminal, and controls the electric device to stop an operation of the electric device based on detection of power stoppage, in a stand-by mode in which the electric device fails to operate and the power is supplied to the electric device from the commercial power supply, the power supply circuit performs an intermittent oscillation with one cycle that consists of a period, in which a power semiconductor switching element oscillates and the power is output, and a period, in which the power semiconductor switching element does not perform the intermittent oscillation and the power is not output, and if it is not detected that the signal is continuously input to the power stoppage detection terminal for a constant time or more relative to the one cycle of the intermittent oscillation, the control microcomputer detects that the power stoppage occurs to the power supply circuit.

According to the electric device of the present invention, it is possible to accurately detect whether the electric device is in the stand-by mode or power stoppage occurs to the power supply circuit, without error. Namely, if the electric device is in the stand-by mode and the power supply circuit performs an intermittent oscillation operation, it is possible to accurately detect that the electric device is in the stand-by mode without erroneously determining that the power stoppage occurs.

On the other hand, if no signal is continuously output from the power stoppage detection circuit for the constant time or more, then it is possible to accurately detect that the power stoppage occurs.

It is preferable that the constant time relative to the one cycle of the intermittent oscillation is set at 1.5 times or more of the one cycle. Namely, in the determination as to whether the power stoppage occurs or the electric device is in the stand-by mode, it is preferable to set the time based on which the determination is made at the time at least 1.5 times or more of one cycle of the intermittent oscillation operation. If the time is set at less than 1.5 times of the cycle, there is a probability that it is determined that the power stoppage occurs although the electric device is in the stand-by mode.

It is also preferable that the constant time relative to the one cycle of the intermittent oscillation is set at 2.5 times or less of the one cycle. Namely, if the power stoppage occurs, the control microcomputer can deal with the occurrence of the power stoppage immediately. Therefore, the time based on which it is detected whether the power stoppage occurs or the electric device is in the stand-by mood is preferably set at 2.5 times or less of the cycle of the intermittent oscillation operation.

It is further preferable that the constant time relative to the cycle of the intermittent oscillation is set at twice as long as the cycle. It is thereby possible to more accurately detect whether the electric device is in the stand-by mode or the power stoppage occurs.

DETAILED DESCRIPTION OF THE PREFERRED EMBODIMENT

Figure 1:
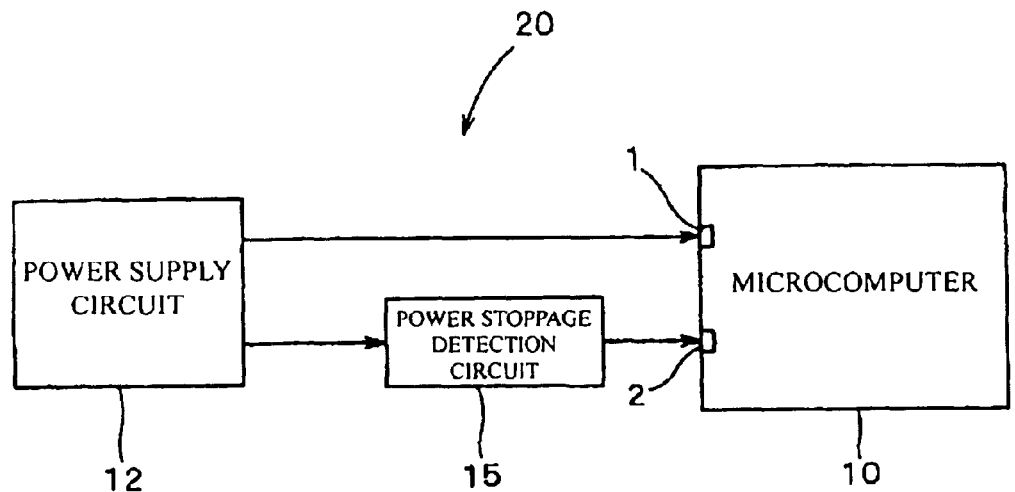
FIG. 1 is a block diagram of an electric device in one embodiment of the present invention.

An embodiment of the present invention will be described hereinafter with reference to FIGS. 1 to 3. FIG. 1 is a block diagram, which illustrates the schematic configuration of an electric device 20 in one embodiment of the present invention. The electric device 20 includes a power supply circuit 12, a power stoppage detection circuit 15, and a control microcomputer 10.

The electric device 20 also includes a power switch which is not shown in FIG. 1. This power switch is turned on and off by an operation of a user who uses the electric device 20. When the power switch is turned on, the electric device 20 starts its operation. When the power switch is turned off, the electric device 20 stops its operation.

The power supply circuit 12 supplies a required operating power to each constituent element of the electric device 20. The power supply circuit 12 is connected to An AC power supply cord (AC power supply power cable), not shown. Through this AC power supply cord, an AC power is supplied from a commercial power supply to the power supply circuit 12. The power supply circuit 12 converts the AC power input from the commercial power supply to an operating power for causing the electric device 20 to operate, and outputs the operating power.

The power supply circuit 12 includes therein a power semiconductor switching element such as a power FET. Using an oscillation operation of the power semiconductor switching element, the power supply circuit 12 converts the AC power supplied from the commercial power supply to the operating power.

When the power switch is turned on, the power semiconductor switching element of the power supply circuit 12 performs a constant oscillation operation and the power supply circuit 12 outputs the required operating power for causing the electric device 20 to operate. On the other hand, when the power switch is turned off, the electric device 20 turns into a stand-by mode and the power supply circuit 12 performs an intermittent oscillation operation.

This intermittent oscillation operation is an operation for intermittently outputting a power by repeating a cycle that consists of a period in which the power semiconductor switching element of the power supply circuit 12 performs the oscillation operation and the power is output and a period in which the power semiconductor switching element of the power supply circuit 12 does not perform the oscillation operation and no power is output. By performing this intermittent oscillation operation, it is possible to prevent unnecessary power consumption.

As for performing this intermittent oscillation operation, the period in which the power is output and the period in which no power is output are determined by a circuit constant of a capacitor or the like provided in a circuit on an output side of the power semiconductor switching element of the power supply circuit 12.

The control microcomputer 10, to be described later, detects whether the power switch is turned on or off. If the control microcomputer 10 detects that the power switch is turned off, the control microcomputer 10 sets the electric device 20 in a low power consumption mode for saving power consumption and controls the power supply circuit 12 to perform the intermittent oscillation operation.

Further, the power supply circuit 12 includes a circuit that constantly outputs a constant power with which the control microcomputer 10, to be described later, can operate. If the power supply circuit 12 performs the intermittent oscillation operation, the circuit that constantly outputs the constant power supplies a power to the control microcomputer 10.

As the other constituent elements of the power supply circuit 12, constituent elements of a well-known power supply circuit included in an electric device that operates in response to the supply of an AC power can be appropriately used.

The power stoppage detection circuit 15 is provided so that the control microcomputer 10, to be described later, can detect a state of the operation of the power supply circuit 12. An input side of the power stoppage detection circuit 15 is connected to the power supply circuit 12, and an output side thereof is connected to a power stoppage detection terminal 2 of the control microcomputer 10.

The power stoppage detection circuit 15 generates a detection signal based on a voltage input from the power supply circuit 12, and outputs this detection signal to the power stoppage detection terminal 2 of the control microcomputer 10.

This power stoppage detection circuit 15 can include an assurance circuit that keeps a voltage level of the detection signal to be constant even if the power supply circuit 12 performs the intermittent oscillation operation.

Namely, if the electric device 20 turns into a stand-by mode, the power supply circuit 12 performs an intermittent oscillation operation, and the detection signal generated by the voltage level of the power stoppage detection circuit 15 thereby fails to reach the constant level, then the control microcomputer 10 determines that power stoppage occurs to the power supply circuit 12 and exerts control during the power stoppage. In the case of that the electric device 20 is in the stand-by mode, the assurance circuit comprised of a capacitor or the like can be provided in this power stoppage detection circuit 15 so as to keep the voltage level of the detection signal generated by the power stoppage detection circuit 15 constant.

As for the other constituent elements of the power stoppage detection circuit 15, constituent elements of a well-known power stoppage detection circuit included in an electric device that includes a power supply circuit, the power stoppage detection circuit, and a control microcomputer, and that is constituted so that the control microcomputer detects whether power stoppage occurs to the power supply circuit can be appropriately used.

The control microcomputer 10 controls the operation of the electric device 20. The control microcomputer 10 includes a power supply terminal 1. The power supply terminal 1 is connected to the power supply circuit 12, and the power for causing the control microcomputer 10 to operate is supplied to the control microcomputer 10 from the power supply circuit 12 through this power supply terminal 1.

The control microcomputer 10 also includes the power stoppage detection terminal 2. This power stoppage detection terminal 2 is normally referred to as "power fail terminal". The power stoppage detection terminal 2 is connected to the output side of the power stoppage detection circuit 15, and the detection signal generated by the power stoppage detection circuit 15 is input to the control microcomputer 10 through this power stoppage detection terminal 2.

The control microcomputer 10 further includes a CPU (central processing unit), a ROM (read only memory), and a RAM (random access memory), none of which are shown, so as to be able to control the operation of the electric device 20. The ROM of the control microcomputer 10 stores a control program for executing steps of procedures for controlling the operation of the electric device 20.

When the detection signal is input to the power stoppage detection terminal 2, the detection signal is read by the control program. Therefore, the control microcomputer 10 can detect the state of the operation of the power supply circuit 12 in accordance with the detection signal.

The detection signal generated by the power stoppage detection circuit 15 while the electric device 20 is in the stand-by mode will next be described with reference to FIG. 2. FIG. 2 illustrates one example of the detection signal generated by the power stoppage detection circuit 15. In FIG. 2, the horizontal axis indicates time (t) and the vertical axis indicates the voltage level (V (volt)).

Figure 2:
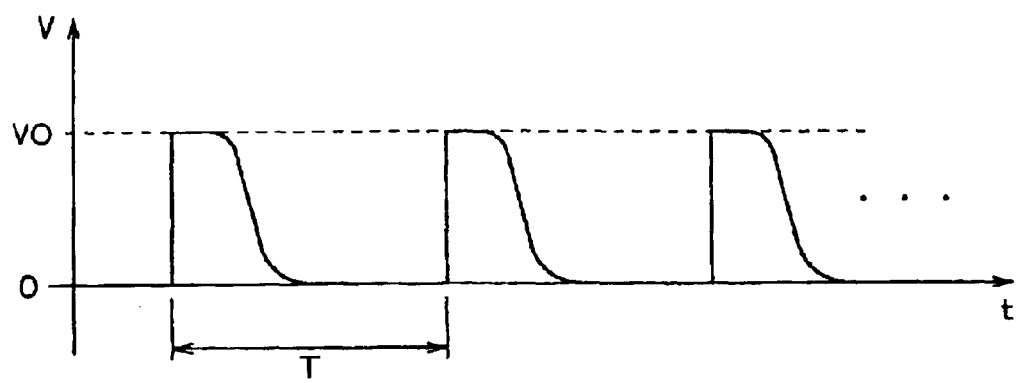
FIG. 2 illustrates one example of a detection signal generated by a power stoppage detection circuit.
Figure 3:
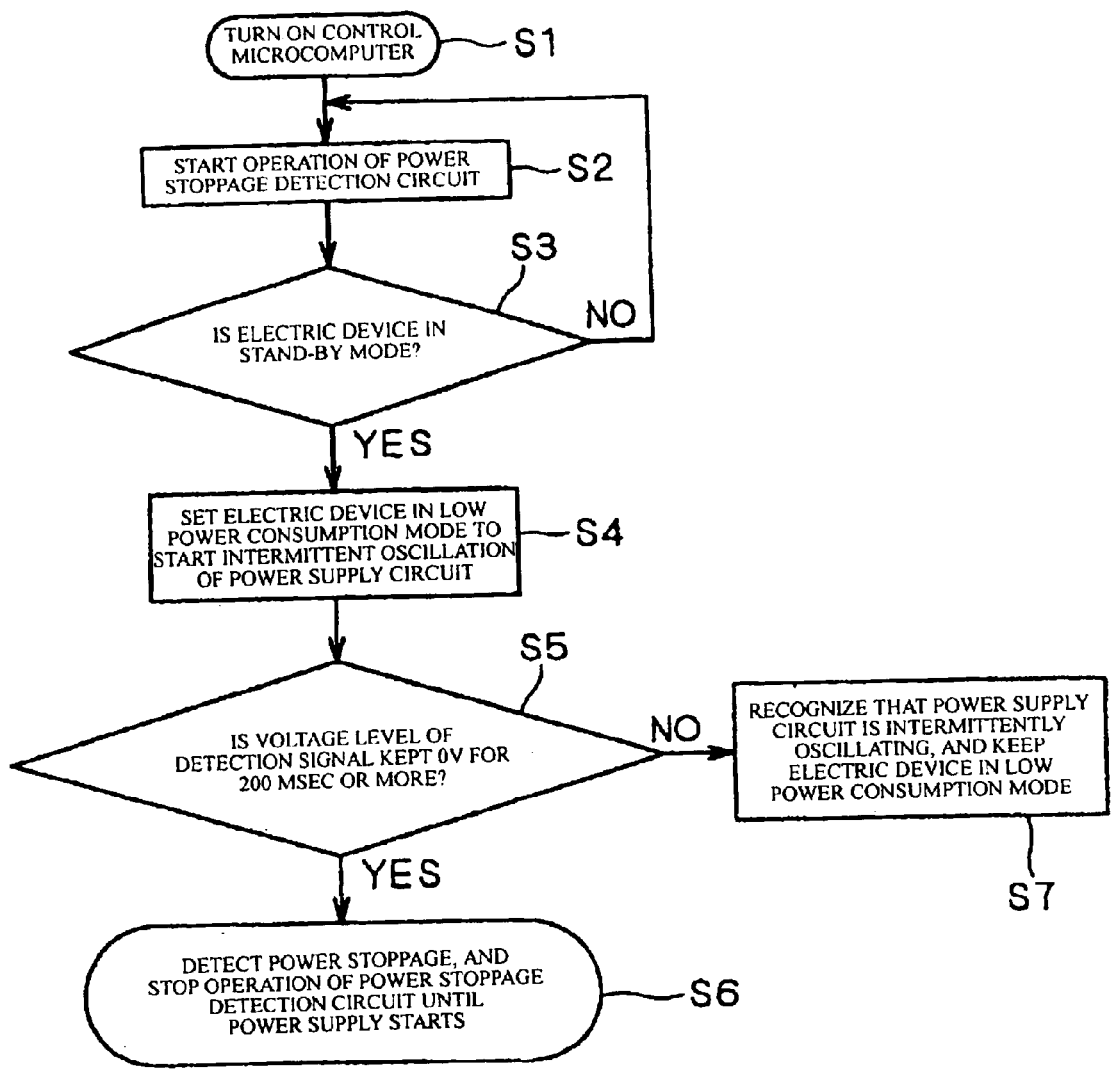
FIG. 3 is a flow chart which illustrates one example of steps of procedures for causing the electric device to operate.

When the electric device 20 turns into the stand-by mode and the power supply circuit 12 performs the intermittent oscillation operation, the power stoppage detection circuit 15 generates the detection signal shown in FIG. 2. As shown in FIG. 2, the detection signal is a signal which repeatedly outputs cycles T each consisting of a period in which a voltage is output and a period in which no voltage is output.

The cycle T of the detection signal is generated to correspond to one cycle in which the power semiconductor switching element of the power supply circuit 12 performs the intermittent oscillation operation. If the power supply circuit 12 performs the intermittent oscillation operation with one cycle set at, for example, about 100 milliseconds, one cycle T of the detection signal is about 100 milliseconds.

If the assurance circuit is provided in the power stoppage detection circuit 15, the assurance circuit is intended to keep the voltage level of the detection signal at a constant voltage level V0 shown in FIG. 2. If the constant voltage V0 is continuously input, the control microcomputer 10 determines that no power stoppage occurs to the power supply circuit 12.

An example in which the electric device 20 operates will next be described with reference to FIG. 3 as well as FIGS. 1 and 2. FIG. 3 is a flow chart which illustrates one example of steps of procedures for causing the electric device 20 to operate.

The AC power supply cord of the electric device 20 is connected to the commercial power supply. The power is thereby supplied from the power supply circuit 12 to the power supply terminal 1 of the control microcomputer 10, the control microcomputer 10 is turned on to start its operation, and the control program is executed (in S1).

Thereafter, the power stoppage detection circuit 15 starts its operation (in S2). It is detected whether the electric device 20 is in the stand-by mode in which the power switch is turned off (in S3).

If it is detected in the step S3 that the electric device 20 is in the stand-by mode ("YES" in S3), the mode of the electric device 20 is changed to a lower power consumption mode to cause the power supply circuit 12 to perform the intermittent oscillation operation (in S4). The power stoppage detection circuit 15 monitors the detection signal input to the power stoppage detection terminal 2, and determines whether the voltage level of the detection signal is kept 0V for a time twice or more of one cycle T of the intermittent oscillation operation (in S5). If the cycle T of the intermittent oscillation operation of the power supply circuit 12 is, for example, 100 milliseconds, the power stoppage detection circuit 15 detects whether the state in which the detection signal is at 0V is kept for 200 milliseconds or more (in S5).

If it is detected in the step S5 that the voltage level of the detection signal is kept 0V for the time twice or more of the cycle T ("YES" in S5), the power stoppage detection circuit 15 detects that power stoppage occurs and does not operate until power supply starts (in S6). Examples of the power stoppage includes an instance in which no power is supplied to the power supply circuit 12 due to power stoppage of the commercial power supply and an instance in which the AC power supply cord of the electric device 20 is disconnected from the commercial power supply and no power is thereby supplied to the power supply circuit 12.

If the power stoppage detection circuit 15 does not detect in the step S5 that the state in which the voltage level of the detection signal is 0V is kept for the time twice as long as the cycle T ("NO" in S5), it is recognized that the power supply circuit 12 performs the intermittent oscillation operation and the electric device 20 is kept in the low power consumption mode (in S7).

If it is detected in the step S3 that the power switch is turned on and that the electric device 20 is not in the stand-by mode ("NO" in the step S3), the steps S2 and S3 are repeatedly executed until the electric device 20 turns into the stand-by mode.

In the above-state example, if it is detected in the step S5 whether the state in which the voltage level of the detection signal is 0V is kept for the constant time or more, the constant time is set based on the time twice as long as one cycle T of the intermittent oscillation operation. If the state in which the voltage level of the detection signal is 0V is kept for the time twice or more of the cycle T, it is determined that power stoppage occurs.

The time based on which it is detected whether the power stoppage occurs can be set in a range of 1.5 times or more and 2.5 times or less of the cycle T of the intermittent oscillation operation. Namely, in the determination as to whether power stoppage occurs to the power supply circuit 12, it is preferable to set the time based on which the determination is made at the time at least 1.5 times or more of the cycle T of the intermittent oscillation operation. If the time is set at less than 1.5 times of the cycle T, there is a probability that it is determined that the power stoppage occurs although the electric device 20 is in the stand-by mode.

It is also preferable that the control microcomputer 10 can deal with the occurrence of the power stoppage immediately. Therefore, the time based on which it is detected whether the power stoppage occurs is preferably set at 2.5 times or less of the cycle T of the intermittent oscillation operation.

According to the electric device 20 stated above, by causing the power supply circuit 12 to perform the intermittent oscillation operation, the control microcomputer 10 can detect whether power stoppage occurs to the power supply circuit 12 or the electric device 20 is in the stand-by mode without error even if the detection signal in the form of an intermittent pulse is output from the power stoppage detection circuit 15.

That is, even if the assurance circuit described above is provided in the power stoppage detection circuit 15, the voltage level of the detection signal cannot be always kept at V0 but the detection signal has a period in which the voltage level of the detection signal is 0V as shown FIG. 2.

According to the electric device 20 described above, even if the period in which the voltage level of the detection signal is 0V is present as shown in FIG. 2, it is possible to detect that the electric device 20 is in the stand-by mode without erroneously detecting that power stoppage occurs.

As described so far, according to the present invention, if the electric device is in the stand-by mode and the power supply circuit performs the intermittent oscillation operation, it is possible to accurately detect whether the electric device is in the stand-by mode or power stoppage occurs without error. It is thereby possible to accurately control the operation of the electric device in accordance with the determination as to whether the electric device is in the stand-by mode or power stoppage occurs.

What is claimed is:

1. An electric device comprising:

a control microcomputer;

a power supply circuit for converting a power supplied from a commercial power supply to an operating power, and for outputting the operating power; and a power stoppage detection circuit for inputting a signal generated according to an output of the power supply circuit to a power stoppage detection terminal of the control microcomputer, wherein the control microcomputer detects the power stoppage occurs to the power supply circuit based on the signal input to the power stoppage detection terminal, and controls the electric device to stop an operation of the electric device based on detection of power stoppage, in a stand-by mode in which the electric device fails to operate and the power is supplied to the electric device from the commercial power supply, the power supply circuit performs an intermittent oscillation with one cycle that consists of a period, in which a power semiconductor switching element oscillates and the power is output, and a period, in which the power semiconductor switching element does not perform the intermittent oscillation and the power is not output, and if it is not detected that the signal is continuously input to the power stoppage detection terminal for a constant time or more relative to the one cycle of the intermittent oscillation, the control microcomputer detects that the power stoppage occurs to the power supply circuit.

2. The electric device according to claim 1, wherein the constant time relative to the one cycle of the intermittent oscillation is set in a range of 1.5 times or more and 2.5 times or less of the one cycle.

3. The electric device according to claim 1, wherein the constant time relative to the cycle of the intermittent oscillation is set at twice as long as the one cycle.

* * * * *